United States Patent [19]

Wegscheider

[11] Patent Number: 5,669,727
[45] Date of Patent: Sep. 23, 1997

[54] DEVICE FOR FIXEDLY INTERCONNECTING TWO PARTS OF A CLOTHES HANGER

[75] Inventor: Gustav Wegscheider, Gemünden am Main, Germany

[73] Assignee: Karner & Company Aktiebolag, Lidkoping, Sweden

[21] Appl. No.: 244,767

[22] PCT Filed: Dec. 14, 1992

[86] PCT No.: PCT/SE92/00859

§ 371 Date: Jul. 25, 1994

§ 102(e) Date: Jul. 25, 1994

[87] PCT Pub. No.: WO93/11681

PCT Pub. Date: Jun. 24, 1993

[30] Foreign Application Priority Data

Dec. 12, 1991 [SE] Sweden .................. 9103665

[51] Int. Cl.⁶ .................. A47G 25/28; F16B 2/00
[52] U.S. Cl. .................. 403/24; 403/282; 403/361; 223/85; 223/95; 24/453
[58] Field of Search .................. 403/282, 280, 403/276, 298, 367, 320, 306, 292, 305, 24; 223/85, 95; 211/113; 411/508–510, 456; 24/297, 453, 614

[56] References Cited

U.S. PATENT DOCUMENTS

| 2,780,128 | 2/1957 | Rapata | 411/510 |
|---|---|---|---|
| 3,227,334 | 1/1966 | Samuelsson | 223/85 |
| 3,963,154 | 6/1976 | Schwartz et al. | 223/85 |
| 3,966,339 | 6/1976 | Nemscek et al. | 403/292 |
| 4,046,293 | 9/1977 | Garrison . | |
| 4,392,278 | 7/1983 | Mugglestone | 24/614 |
| 4,396,329 | 8/1983 | Wollar | 24/614 X |
| 4,402,641 | 9/1983 | Arff | 411/510 |
| 4,474,298 | 10/1984 | Bishop | 223/85 X |
| 4,610,330 | 9/1986 | Borst | 411/510 X |
| 4,728,238 | 3/1988 | Chisholm et al. | 411/510 |
| 4,739,912 | 4/1988 | Klawieter et al. | 223/85 |
| 4,776,739 | 10/1988 | Hamman | 24/297 X |
| 4,834,127 | 5/1989 | Van Sice | 403/298 X |
| 4,902,182 | 2/1990 | Lewis | 411/510 |
| 4,938,645 | 7/1990 | Wollar | 411/510 X |
| 5,232,322 | 8/1993 | Rogensburger | 411/510 X |

FOREIGN PATENT DOCUMENTS

| 64768 | 11/1982 | European Pat. Off. | 411/510 |
|---|---|---|---|
| 0376402 | 7/1990 | European Pat. Off. . | |
| 2437190 | 5/1980 | France | 223/95 |
| 2624805 | 12/1977 | Germany . | |
| 462413 | 6/1990 | Sweden . | |
| 256380 | 8/1926 | United Kingdom | 403/282 |
| 9217706 | 10/1992 | WIPO | 423/292 |

*Primary Examiner*—Harry C. Kim
*Attorney, Agent, or Firm*—Marshall & Melhorn

[57] ABSTRACT

A device for fixedly interconnecting two parts (1, 2) of a clothes hanger comprising at least one cylinder socket (3) on one part and at least one pin (4) on the other part to be inserted into the socket. The pin (4) has at least one non-cylindrical portion (9) with a radius exceeding the radius of the socket. This portion is flexible in the direction of insertion of the pin for wedging the pin in the socket after insertion.

11 Claims, 1 Drawing Sheet

U.S. Patent    Sep. 23, 1997    5,669,727
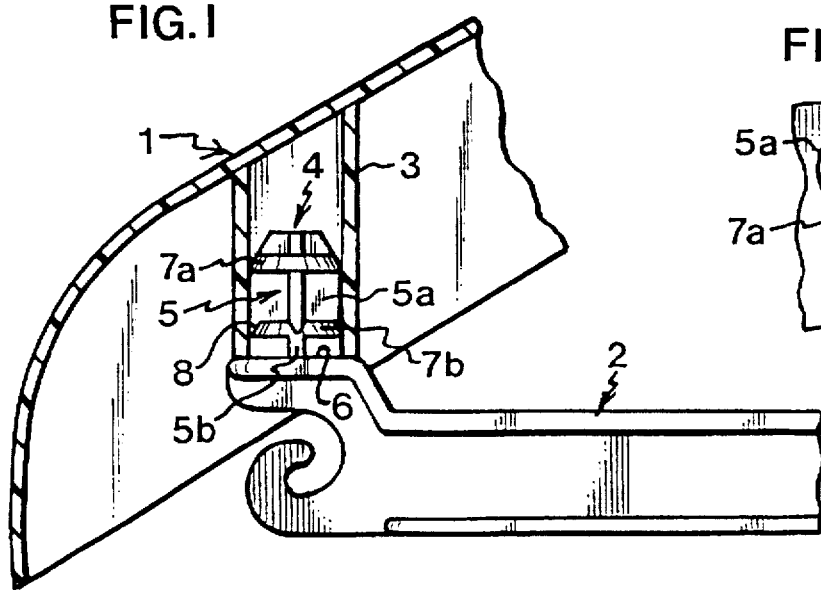
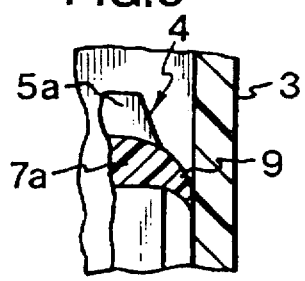
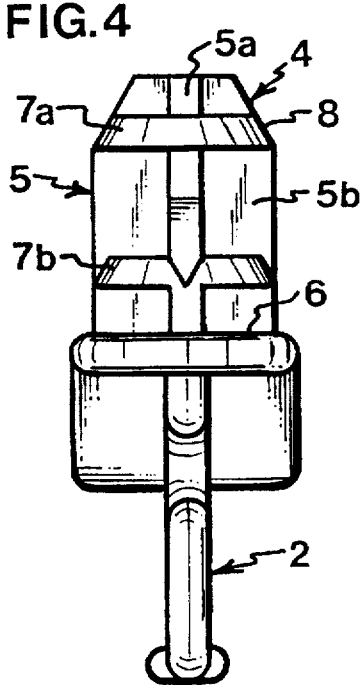
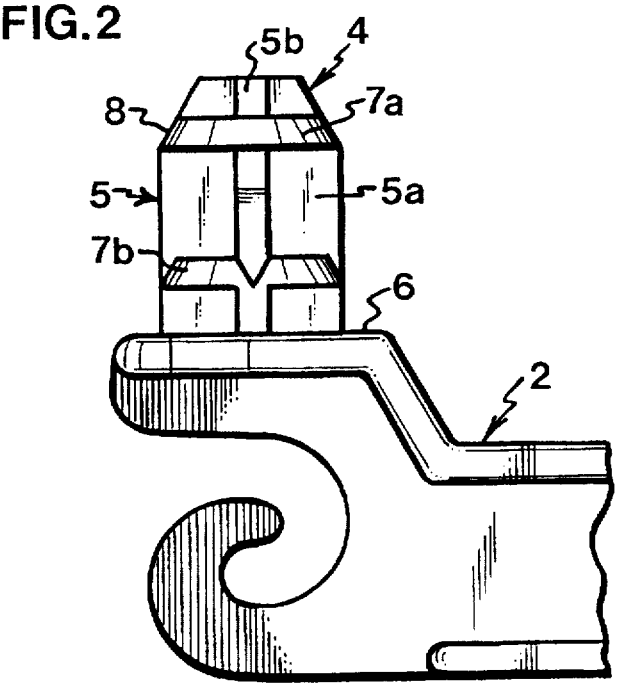
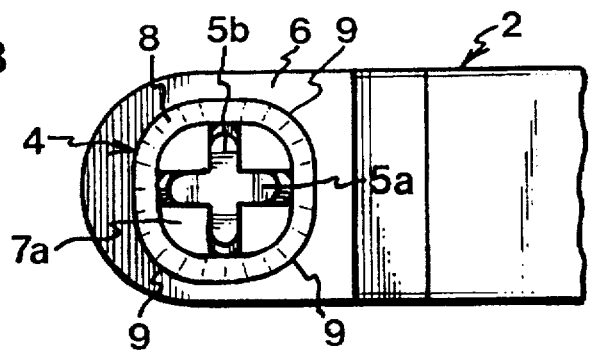

DEVICE FOR FIXEDLY INTERCONNECTING TWO PARTS OF A CLOTHES HANGER

BACKGROUND OF THE INVENTION

1. Field of the Invention

The present invention relates to a device for fixedly interconnecting two parts of a clothes hanger, said device comprising at least one cylindrical socket on one part and at least one pin on the other part to be inserted in the socket. More particularly, the invention relates to a trouser crossbar to be fixedly connected to a clothes hanger via cylindrical sockets on the clothes hanger and corresponding pins on the trouser crossbar.

2. Description of the Prior Art

Today the producers of clothes hangers aim at high flexibility. As an example, it may be mentioned that a clothes hanger is constructed with elements for receiving a trouser crossbar. The clothes hanger is supplied with or without a crossbar, as desired by the customer. Thus, it is important to be able to manufacture a standard clothes hanger which can be supplemented with the crossbar. Normally such supplementary mounting is effected in the factory, but there is nothing to prevent this from taking place in the garment factory or even in the clothing shop.

There are different ways of constructing the hanger and the crossbar to permit this supplementary mounting. U.S. Pat. No. 4,046,293 discloses a plastic clothes hanger with downwardly extending sockets on the lower side of the hanger. The sockets are formed with recesses in the inner wall for receiving a resilient tongue on the end of the crossbar, thereby locking the crossbar in the hanger. This design results in satisfactory strength and simple supplementary mounting but renders the manufacture of hanger and crossbar considerably more expensive owing to the complex moulds that are required for forming the recess in the socket. DE 26,24,805 discloses a clothes hanger with cylindrical sockets on the lower side of the hanger for receiving cylindrical pins in the ends of the crossbar. In this construction, the pins must be glued to the sockets in order to attain the requisite strength. Also this method makes the manufacture of the hanger more expensive, since the machine for making the hanger and crossbar must be fitted with components for the gluing operation. Moreover, the gluing operation causes environmental problems.

The main object of the invention is to make the manufacture of clothes hangers, which consist of a plurality of parts assembled afterwards, less expensive.

SUMMARY OF THE INVENTION

This object is achieved by means of a device of the type described above, which is characterised in that the pin has at least one portion of a radial extent exceeding the radial extent of the socket, and that this portion is flexible in the direction of insertion of the pin to enable the inserted pin to be wedged in the socket.

It should be mentioned in the context that all products for supporting, transporting and presenting garments are to be ranked in the same category as clothes hangers.

BRIEF DESCRIPTION OF THE DRAWINGS

The invention will now be described in more detail by means of an example, with reference to the accompanying drawing.

FIG. 1 is a sectional view of a portion of a clothes hanger fitted with a crossbar, FIGS. 2–4 are different perspective views of one end of the crossbar, and FIG. 5 is an enlarged view of the area of the pin portion which is deformed when engaging the socket.

The clothes hanger comprises a hanger part 1 of which an end portion is shown in section in FIG. 1. The hanger part is U-shaped in cross-section, the opening of the U facing downwards. A cylindrical socket 3 is formed inside the U and extends downwards from the bottom of the U. It should be noted that a corresponding socket is to be found on the opposite end portion of the hanger part. A crossbar 2 is, via a pin inserted in the socket 3, mounted on the hanger 1. It will be appreciated that the other end of the crossbar has a corresponding pin to be inserted in a corresponding socket on the hanger.

The pin is arranged on a shoulder 6 and consists of two crossed vertical plates 5a, 5b forming a shaft 5. The width of the plates is equal to the diameter of the socket. An upper disc 7a and a lower disc 7b are formed on the shaft to constitute engagement means. FIG. 3 illustrates how the upper disc 7a deviates from the circular shape by having, in each quadrant between the two crossed plates 5a and 5b, a portion 9 of a radius which is greater than the radius of the socket 3. Moreover, the circumferential edge 8 of each disc is bevelled. The discs as well as the shaft and the remaining part of the crossbar are made of a suitable plastic material by injection moulding. The thickness of the discs 7a and 7b is also such as to make the discs flexible or deformable when being inserted into the socket 3. Such flexing takes place at the portions 9 and is illustrated in FIG. 5. The combination of the flexible portion 9 and the bevelled edge 8 leads to the pin being wedged in the socket after insertion of the pin 4 into the socket 3. If one tries to pull the crossbar 2 downwards as seen in FIG. 1, the pin will be wedged more firmly in the socket.

Other constructions of the pin than the one illustrated in the drawing are, of course, feasible, e.g. only one engagement means engaging with the socket can be used in extreme cases.

I claim:

1. A clothes hanger, said cloths hanger including:
   a) a hanger part (1) having at least one downwardly extending cylindrical socket (3), and;
   b) a cross bar portion (2) having at least one corresponding pin (4) to be inserted into said downwardly extending socket, characterized in that said pin comprises at least one continuous non-circular portion extending radially from the pin and having a radius exceeding a radius of the socket, and said non-circular portion (9) is flexible in the direction opposite to the direction of insertion of the pin for wedging the pin in the socket after the insertion.

2. The hanger according to claim 1, wherein said cross bar portion (2) is characterized in that said non-circular portion (9) is part of a radially oriented disk (7A) formed on a shaft (5).

3. The hanger defined in claim 2, wherein said cross bar portion (2) is characterized in that said disk (7A) has a beveled edge (8) at said non-circular portion (9), which facilitates the flexing of said non-circular portion in said socket (3).

4. A clothes hanger, said clothes hanger including, in combination;
   a) a hanger part (1) of U-shaped cross section having at least one downwardly extending cylindrical socket (3), and;

b) a cross bar portion (2), said cross bar portion having at least one pin (4) to be inserted into the socket (3), characterized in that said pin (4) comprises at least one continuous non-circular portion (9) extending radially from the pin and having a radius exceeding a radius of the socket (3), and said non-circular portion is axially flexible with respect to the axis of the pin for wedging the pin in the socket after insertion.

5. A clothes hanger, said clothes hanger including in combination:
   a) a hanger portion (1), said hanger portion having at least one cylindrical socket (3), and;
   b) a crossbar portion (2) having at least one pin (4) to be inserted in said socket (3), characterized in that said pin (4) comprises at least one continuous non-circular portion (9) extending radially from the pin and having a radius exceeding a radius of the socket, and said non-circular portion is axially flexible with respect to the axis of the pin for wedging said pin in the socket after insertion.

6. The clothes hanger defined in claim 5, characterized in that said non-circular portion (9) is part of a radially oriented disk (7A) formed on a shaft (5).

7. The hanger defined in claim 6, wherein said crossbar (2) is characterized in that the disk (7A) has a beveled edge (8) at said non-circular portion (9), which facilitates the flexing of said non-circular portion in said socket (3).

8. The hanger defined in claim 7, wherein said hanger portion (1) has two of aid sockets (3), and said crossbar portion has two of said pins (4).

9. A clothes hanger, said clothes hanger including, in combination:
   a) a hanger part, said hanger part including at least one downwardly extending cylindrical socket (3), and;
   b) a crossbar portion (2) having at least one corresponding pin (4) to be inserted in said socket (3), said pin consisting of:
      i) a pair of crossed vertical plates (5a, 5b), the width of each of said vertical plates being equal to a diameter of the socket (7), and;
      ii) a segmental portion of a disk (9) in each quadrant formed by said pair of crossed plates (5a, 5b), said segmental portion of said disk being non-circular with respect to the longitudinal axis of the pin (4).

10. The clothes hanger defined in claim 9, wherein said hanger part (1) has a pair of said downwardly extending cylindrical sockets (3), and said crossbar portion (2) has a pair of said corresponding pins (4).

11. The hanger defined in claim 10, characterized in that each of said segmental portions (9) has a beveled edge (8) which facilitates the flexing of said segmental portion in said socket (3).

* * * * *